United States Patent

[11] 3,613,069

| [72] | Inventors | Boyd B. Cary, Jr.<br>Pittsford;<br>Francis H. Fenlon, Rochester, both of N.Y. |
|------|-----------|---|
| [21] | Appl. No. | 859,675 |
| [22] | Filed | Sept. 22, 1969 |
| [45] | Patented | Oct. 12, 1971 |
| [73] | Assignee | General Dynamics Corporation |

[54] SONAR SYSTEM
16 Claims, 4 Drawing Figs.

[52] U.S. Cl. .................................................. 340/3 R,
181/0.5 A, 340/5 R
[51] Int. Cl. ..................................................... G01s 9/68
[50] Field of Search ............................................ 340/3, 5, 6,
1; 181/0.5 A, 0.5 R

[56] References Cited
UNITED STATES PATENTS
| 3,398,810 | 8/1968 | Clark ............................ | 181/0.5 |
| 3,510,833 | 5/1970 | Turner ......................... | 340/5 X |

Primary Examiner—Richard A. Farley
Attorneys—Martin LuKacher

ABSTRACT: A sonar system is described which operates by parametrically interacting two ultrasonic waves of different frequency, at least one of which is of finite amplitude. The resulting wave due to the intermodulation component overrides the signal level of the primary waves at long ranges from the sources thereon and has high directivity.

INVENTORS.
BOYD B. CARY, JR.
FRANCIS HUGH FENLON

BY

ATTORNEY

SONAR SYSTEM

The present invention relates to sonar systems, and particularly to parametric sonar systems which generate or receive sonar signals by the parametric interaction of two signals of different frequency in water.

The invention is especially suitable for use in long range directional sonar wherein it provides highly directional beams using small arrays which are not significantly susceptible to cavitation effects. The invention, however, is generally applicable to systems utilizing nonlinear parametric interaction or acoustic mixing of waves.

Heretofore, sonar systems have been operated in order to avoid nonlinear effects. Such effects have been regarded as distortion which derogates the performance of sonar systems. Thus, present sonar transmitting arrays are usually operated below the threshold of significant nonlinear effects.

According to the invention, it has been found that when the sound pressure level of at least one of two acoustic waves having different frequencies is raised above a threshold, significant nonlinear effects occur, and intermodulation components are parametrically generated more efficiently than if they were radiated directly. The sources of the waves are referred to herein as the "pump" and the "mixer"; the pump having the higher initial sound pressure level. At long ranges, the intermodulation component, particularly the difference frequency component, will override both the pump and mixer wave sound pressure levels. The pump wave can be thought to be continuously parametrically generating the difference frequency wave for a considerable distance outwardly therefrom, such that many virtual sources of the difference frequency wave exist. A directly generated component on the other hand, emanates from a single source and undergoes losses due to spreading, or the production of its own harmonics. Accordingly, the difference frequency wave is radiated more efficiently than it would be if launched directly. Further, even with simple spherical or cylindrical sources good directivity is obtained. Thus, the expense of a large array and its driving sources for obtaining directivity is avoided. The threshold at which nonlinear effects and the parametric generation of the frequency component become significant occurs at sound pressure levels which in water are relatively high, say 130 to 150 db. (reference 1 micro bar) in the vicinity of the source (viz at 1 meter from the source). Since the threshold depends upon the medium and the frequency of the waves, it may be expressed in terms of the Goldberg number, $G$ which is defined by the following equation where $$G = 2\pi\beta\epsilon/\lambda\alpha$$

where $\beta$ is 3.8 for seawater; $\epsilon$ is the peak particle velocity Mach number at the source boundary (viz the ratio of peak particle velocity which would be generated at the source due to small signal levels); $\lambda$ is the wavelength of the sound waves; and $\alpha$ is the attenuation coefficient of the medium.

A further of the parametric sonar system provided by the invention is the reduction of reverberation effects. Reverberation adversely affects the signal to noise ratio of the sonar signal. Inasmuch as the parametrically generated component has a relatively low amplitude near the sources, the reverberant level at the frequency of interest will be low. In other words, the operating frequency for echo ranging is the frequency difference between the frequency of the sources which are intermodulated with each other. The level of this difference frequency component gradually increases along the propagation path and may be considered to be generated by a spatially extended virtual source, due to the continuous nonlinear mixing of the primary beams along the propagation path. The beam at the operating frequency is also highly directive and has small, if any, side lobe structure, thereby further reducing reverberant levels.

Another feature of the invention is the avoidance of cavitation effects. Cavitation thresholds vary directly as the static pressure of the water and rapidly increase with frequency. Inasmuch as the parametrically generated beam may be generated by sources having high ultrasonic frequencies, cavitation is avoided. The cavitation limit does not preclude the generation of the primary (signal and mixer) beams at high sound pressure levels, because of their high frequency. Thus, the difference frequency component may be parametrically generated without cavitation.

Another feature of the invention which lends itself to enhancing the performance of long range sonar is attenuation effects due to the influence of salt water dispersion. Dispersion is a function of the frequency of the acoustic waves and varies directly with frequency. Accordingly, the dispersion effect and therefore the attenuation on the difference frequency beam which is parametrically generated is reduced.

Accordingly, it is an object of the present invention to provide improved underwater acoustic systems.

It is a further object of the present invention to provide an improved sonar system which takes advantage of parametric or nonlinear underwater effects.

It is a further object of the present invention to provide an improved parametric sonar system of high directivity.

It is a still further object of the present invention to provide a sonar system which generates a sonar beam parametrically from primary acoustic sources of higher frequency and sound level wherein the beam is generated parametrically with greater efficiency than a beam directly due to the higher frequency sources or directly generated or launched beam of the same frequency as the parametrically generated beam.

It is a still further object of the present invention to provide an improved long range directional sonar system.

It is a still further object of the present invention to provide an improved sonar system in which the return beam is detected by parametric techniques.

It is a still further object of the present invention to provide an improved sonar system which is less limited by cavitation and reverberation effects than conventional sonar systems.

The invention itself, both as to its organization and method of operation, as well as additional objects and advantages thereof will become more readily apparent from a reading of the following description in connection with the accompanying drawings in which.

Figure 1:
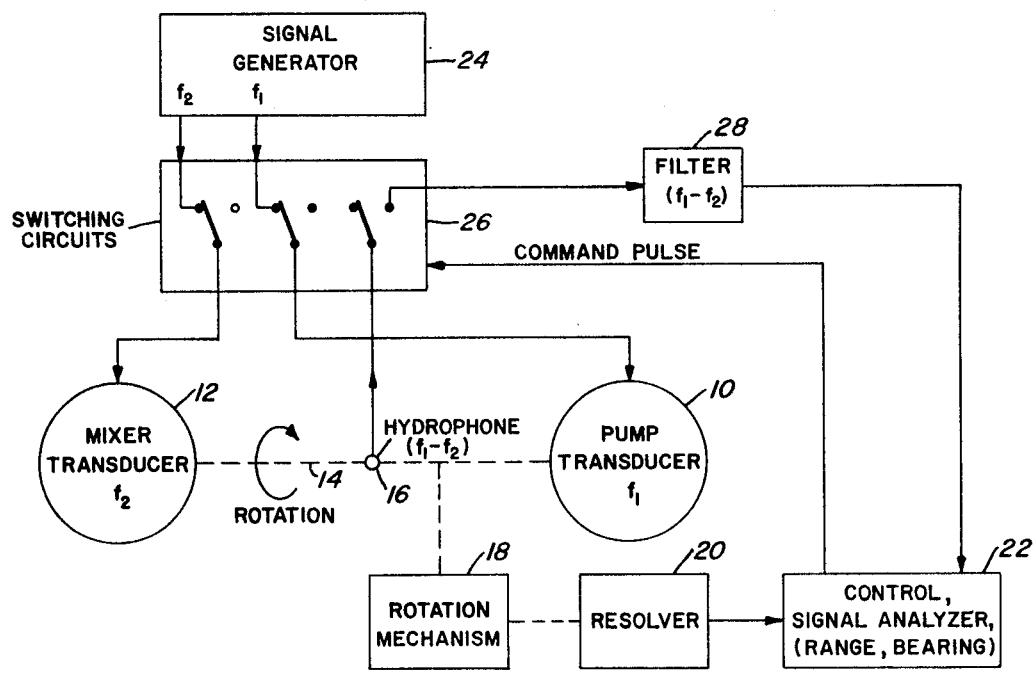
FIG. 1 is a block diagram schematically illustrating a sonar system embodying the invention.
Figure 3:
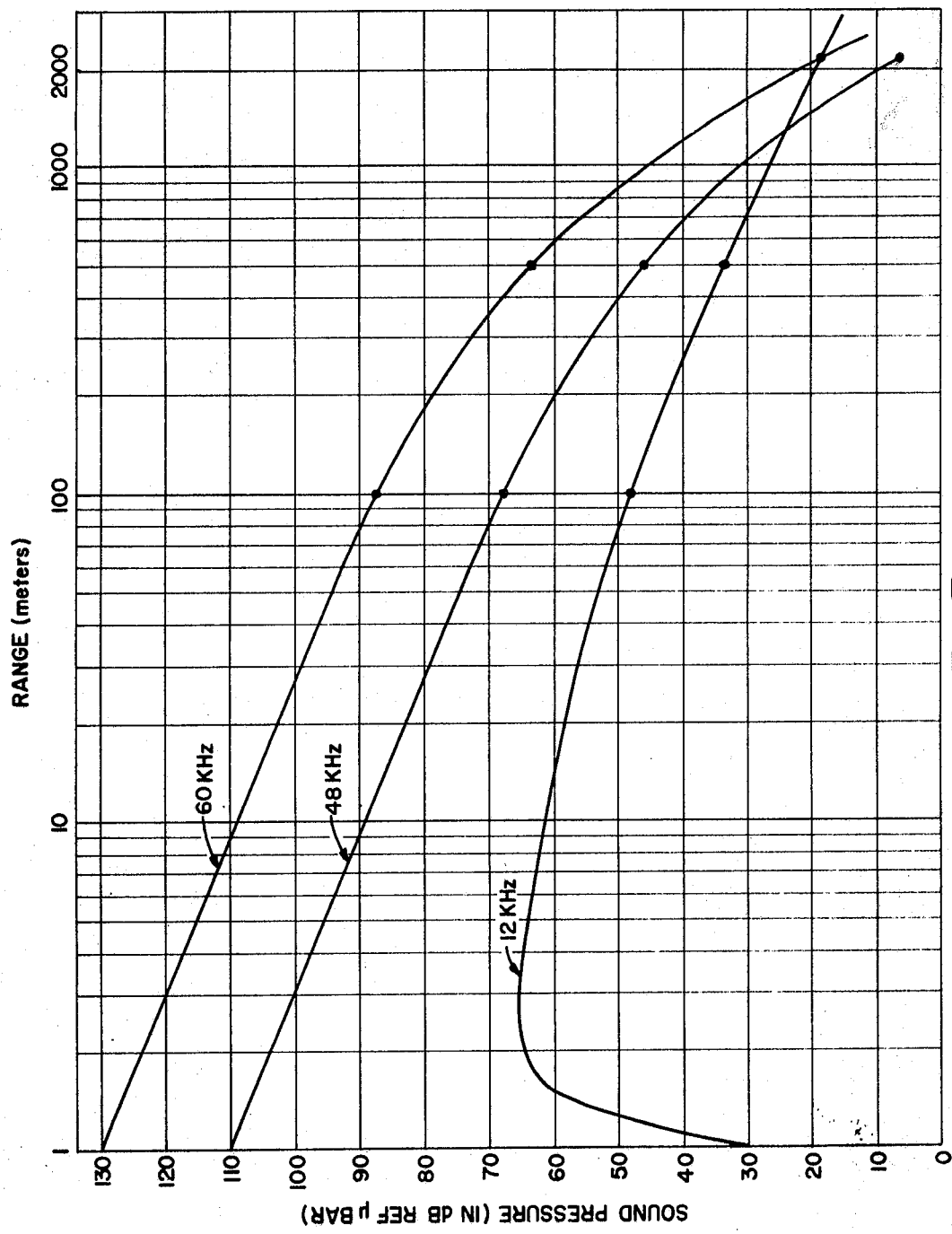
Figure 4:
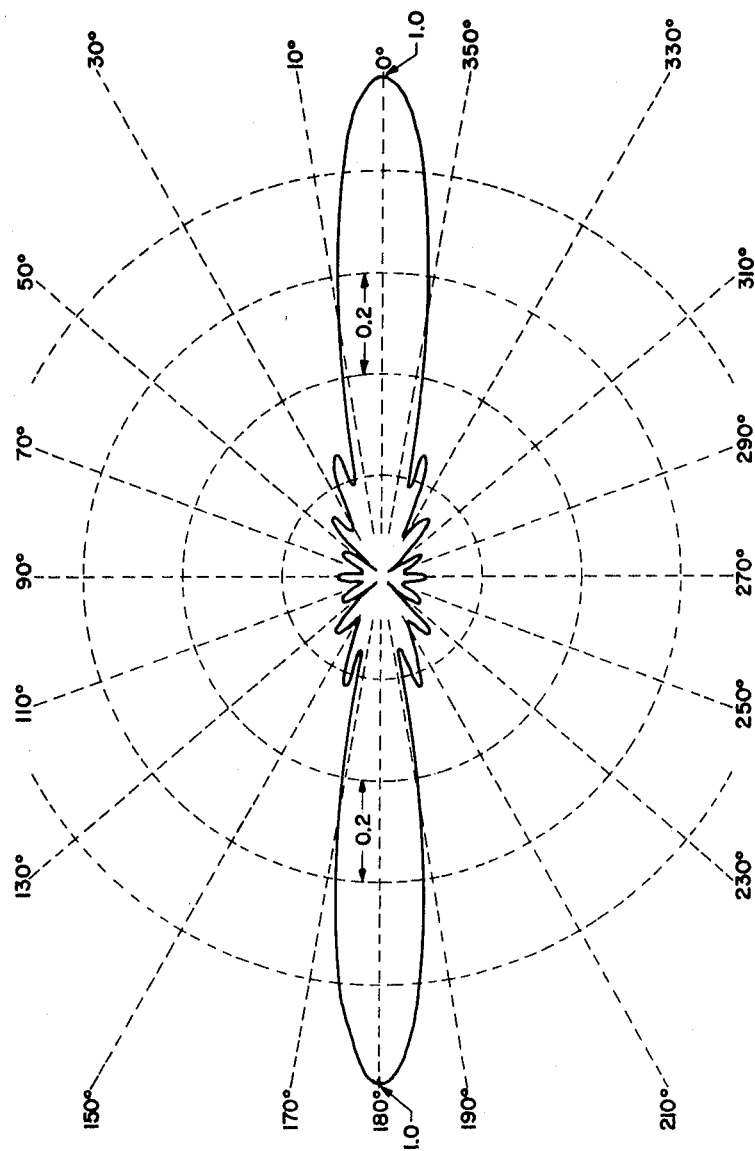

FIG. 3 is a graph of the variation in sound pressure level with distance from the sound for a pair of primary beams and their parametrically generated difference frequency beam; the particular case shown illustrating the results obtained for certain frequencies which may be used in practicing the invention; and FIG. 4 is a directivity plot for the difference frequency beam depicted in FIG. 3, at 1,000 meters from the sources. In the following discussion, the operation and features of the invention will be pointed out through the use of mathematical expressions involving several symbols. In the interest of convenience of reference to these symbols, a list thereof is set forth below:

$G = 2\pi\beta\epsilon/\lambda\alpha$ Goldberg number
$\beta$ = Liquid state or nonlinearity parameter $1 + (B'/2A')$, where $A'$ and $B'$ are the parameters of the equation-of-state
$\epsilon$ = peak particle velocity Mach number at source boundary
$\alpha$ = Attenuation coefficient
$\lambda$ = Wavelength
$k$ = Wavenumber
$x$ = Spatial dimension in plane wave case
$n$ = Ratio of signal to pump frequency
$f$ = Frequency
$P$ = Pressure
$s$ = Cross-sectional area
$r, \theta$ = Field point polar coordinates
$r_o, \theta_o$ = Source point polar coordinates
$\vec{R} = \vec{r} - \vec{r}_o$
$a$ = Cylindrical or spherical source radius
$\theta = \beta\epsilon k r$ Dimensionless range parameter
$\sigma_a = \beta\epsilon k a$ Dimensionless range parameter of source boundary $\nabla^2$ = Laplacian operator
$\eta \eta'$ = Shear and dilatational viscosity coefficients respectively
$\rho_o$ = Ambient density
$c_o$ = Ambient small signal sound speed
$q+, q-$ = Sum and difference frequency, density components (second order)
$\wedge = 2(\beta-1)$
$\psi$ = velocity potential
$*$ = Complex conjugate
$A$ = Amplitude (cm$^2$sec$^{11}$)
$d$ = Source Separation
$J_n(2)$ = Bessel function order $n$
$H_n(1)(z), H_n(2)(z)$ = Hankel functions of the first and second kind, respectively, of order $n$
$Z$ = General argument
$\epsilon_n = \begin{cases} 1, n=0 \\ 2, \text{otherwise} \end{cases}$
$N \simeq ka$ Number of terms in the truncated series
$E_1(r) = \exp(\alpha-\alpha_1-\alpha_2)r$
$E_2(r) = \exp(\alpha-\alpha_1+\alpha_2)r$
$l = \begin{cases} 1; \text{Spherical wave} \\ \frac{1}{2}; \text{Cylindrical wave} \\ 0; \text{Plane wave} \end{cases}$
$W = (\sigma/\sigma_a)^l v/v_a (r=a)$
$v, v_a$ = Velocity in the field and at the source boundary respectively
$W_{Total}$ = General solution of the linearized partial differential equation
$y = \omega(t - r/c_o)$
$t$ = Time
$\omega$ = Angular frequency
$C', C'', C_m$ = Arbitrary constants
$W_{1a}, W_{2a}$ = Values of $W$ at pump and signal source boundaries respectively As shown in FIG. 1, the sonar system provided by the invention generates or launches a sonar beam by means of transducers 10 and 12 which may for example be spherical or cylindrical transducers, which are spaced from each other along on axis 14 indicated by the dash line. In the event that the transducers are cylindrical, their cylindrical axes are parallel to each other. These transducers generate the primary waves. The transducer 10 is referred to as the pump transducer inasmuch as its sound pressure level is greater than the threshold where underwater nonlinear effects become significant, at a frequency of operation $f_1$. The primary wave from the pump transducer is referred to herein as the pump wave and is at ultrasonic frequencies. The other primary wave is produced by the mixer transducer 12 and has an ultrasonic frequency $f_2$ which need not be, but my be above the threshold for significant nonlinear underwater effects. In the particular case which is depicted by way of example in FIG. 3, the pump wave frequency $f_1$ is 60 kHz., while the mixer wave frequency $f_2$ is 48 kHz. Two waves are due to parametric mixing in the medium along the propagation path. One of these waves will have a sum frequency $f_1 + f_2$ while the other has a difference frequency $f_1 - f_2$. As will become more apparent hereinafter, the difference frequency wave (viz the wave of lower frequency than either the pump or mixer primary waves) is most significant for long range sonar.

In order to determine the significance of the parametrically generated wave, the gain of the system may be calculated. As is conventional in parametric systems, a gain is referenced to the mixer frequency. Accordingly, the gain for the difference frequency will be equal to $\frac{P_{f_1-f_2}}{P_{f_2}}$. In other words, the gain is defined as the ratio of the intermodulation or parametrically generated signal pressure amplitude to the pressure amplitude of the mixer signal.

Nonlinear effects occur only if the system operates above the threshold therefor. The Goldberg number of the pump wave is a measure of the relative importance of such nonlinear effects. This number is defined by the equation given above, where the peak particle velocity attenuation coefficient and wavelength are that of the pump source. Nonlinear effects will occur is the Goldberg number is greater than 1. However, practical intermodulation of parametrically generated signals of significant pressure level occur for Goldberg numbers greater than 30. It is preferable also to provide Goldberg numbers of about 100 in order to obtain the full benefit of the parametric beam. Since cylindrical and spherical sources of the primary wave are used, a system of equations has been evolved for determining the parametric gain which demonstrates that the parametrically generated signal, especially the difference signal, has significant power levels and directivity, especially at long ranges. The equations also show that a suitable selection of power levels and primary wave frequencies provide enhanced difference frequency pressure levels at long ranges which are greater than the pressure levels at such ranges due to the primary sources themselves and even exceed the pressure levels due to a directly generated wave at the difference frequency. The gain formula for cylindrical and spherical sources is derived by successive approximations. The Burger's equation including losses is:

$$W_\sigma - \left(\frac{1}{G}\right)W_{yy} = \left(\frac{\sigma_a}{\sigma}\right)^l W W_y \quad (1)$$

$l = 1$; Spherical wave
 $= 1/2$; Cylindrical wave (1)
by method of successive approximation, the nonlinear term on the right hand side of equation (1) is evaluated by using the linear viscous solutions. Thus, equation (1) becomes an inhomogeneous linear equation. The homogeneous solution is $$W = (\sin(1+n)y)\exp-\left(\frac{\sigma-\sigma_a}{G}\right)(1+n)^2 \quad (2)$$

It can be seen from equation (2) that homogeneous solutions corresponding to the sum or difference frequency ($n\pm 1$).

For the parametric case, the primary field due to both the pump and mixer sources 10 and 12 (FIG. 1) is $$W = W_{1a}(\sin y_1)\exp-\left(\frac{\sigma_1-\sigma_{1a}}{G_1}\right)$$
$$+ W_{2a}(\sin(ny_1))\exp-\left(\frac{\sigma_2-\sigma_{2a}}{G_2}\right) \quad (3)$$

At the source boundary, $\sigma=\sigma_a$. Also as noted in the list of symbols, $n = f_2/f_1$. Accordingly, $$W = W_{1a}\sin y_1 + W_{2a}\sin(ny_1) \quad (4)$$

In the foregoing equations (3) and (4), it will be noted that subscripts 1 and 2 are used 1 designates the pump while 2 designates the mixer. For the sake of simplicity, the parameters of equation (3) are normalized with respect to the initial pump wave (viz the pump wave at the pump source boundary).
Therefore, $W_{1a}$ becomes unity. Also, all $\sigma$'s and $G$'s are normalized to the pump Mach number $\epsilon_1$. Accordingly, $$W = (\sin y_1)\exp-\left(\frac{\sigma_1-\sigma_a}{G_1}\right)$$
$$+ W_{2a}(\sin(ny_1))\exp-\left(\frac{\sigma_1-\sigma_a}{G_2}\right) \quad (5)$$

where $$\alpha_1 r = \frac{\sigma_1}{G_1} \quad (6)$$

and $$\alpha_2 r = \frac{\sigma_2}{G_2} \quad (7)$$

If $\alpha$ is taken to be the classical viscous attenuation coefficient $\alpha_2 = n^2\alpha_1$. Therefore, $\sigma_2/G_2 = n^2(\sigma_1 G_1)$. The sources 10 and 12 are taken also to have equal radii. Therefore $\sigma_{a1} = \sigma_{a2} = \sigma_a$.

From equation (5), the general expression for the sum and difference components follows:

$$WW_y = \frac{W_{2a}}{2}\left\{\exp\left[-\frac{\sigma_1-\sigma_a}{G_1}(1+n^2)\right]\right\}$$
$$[(n+1)\sin(n+1)y + (n-1)\sin(1-n)y] \quad (8)$$

This equation can be rewritten as $$\left(\frac{\sigma_a}{\sigma}\right)^l WW_y$$
$$= \left(\frac{n+1}{2}\right)W_{2a}\left(\frac{\sigma_a}{\sigma}\right)^l e^{-\left(\frac{\sigma_1-\sigma_{a1}}{G_1}\right)(1+n^2)}\sin(1+n)y \quad (9)$$

In equation (9), the plus sign corresponds to the sum component and the minus sign to the difference component. It will also be noted that equation (9) is the inhomogeneous term of equation (1) after having been linearized. Equation (1) may be solved by assuming a particular solution $$W = F(\sigma)e^{-\left(\frac{\sigma-\sigma_a}{G}\right)(1+n^2)}\sin(1\pm n)y \quad (10)$$

In equation (10), the subscript is dropped from the $\alpha$ and $G$, it being understood that these terms are normalized to the pump wave peak particle velocity. When the particular solution is substituted into equation (1), the following ordinary differential equation results:

$$F' \pm 2n\left(\frac{F}{G}\right) = \left(\frac{\sigma a}{\sigma}\right)^l \frac{n\pm 1}{2}W_{2a} \quad (11)$$

The solution of this equation is $$F = e^{\mp\left(\frac{2n}{G}\right)(\sigma-\sigma_a)}\left[C' + \sigma_a{}^l W_{2a}\frac{n\pm 1}{2}e^{\mp\frac{2n\sigma a}{G}}\right]$$
$$\cdot\left[\int\frac{d\sigma}{\sigma^l} \pm \frac{2n\sigma^{2-l}}{G(2-l)} + \left(\frac{2n^2}{G^2}\right)\frac{3-l}{(3-l)}\right]. \quad (12)$$

for $$\frac{n}{G} < 1$$

Therefore, $$W_{Total} = \sin(1\pm n)y\left\{C''e^{-\left(\frac{\sigma-\sigma_a}{G}\right)(1\pm n)^2}\right.$$
$$+ e^{-\left(\frac{\sigma-\sigma_a}{G}\right)(1+n^2)\mp\frac{2n}{G}(\sigma-\sigma_a)}\left[C' + W_{2a}\left(\frac{n\pm 1}{2}\right)\sigma_a{}^l e^{\mp\frac{2n\sigma_a}{G}}\right.$$
$$\left.\left.\cdot\left(\int\frac{d\sigma}{\sigma^l} \pm \left(\frac{2n}{G}\right)\frac{\sigma^{2-l}}{(2-l)} + \left(\frac{2n^2}{G^2}\right)\frac{\sigma^{3-l}}{(3-l)}\right)\right]\right\} \quad (13)$$

For, $$W = 0 \text{ at } \sigma = \sigma_a \quad C'' = \left\{-C' - W_{2a}\left(\frac{n\pm 1}{2}\right)\sigma_a{}^l e^{-\frac{2n\sigma_a}{G}}\right.$$
$$\left.\left[\left(\int\frac{d\sigma}{\sigma^l}\right)_{\sigma_a} \pm \left(\frac{2n}{G}\right)\frac{\sigma_a{}^{2-l}}{(2-l)} + \left(\frac{2n^2}{G^2}\right)\frac{\sigma_a{}^{3-l}}{(3-l)}\right]\right\} \quad (14)$$

The following equation representing the total power therefore results $$W_{Total} = (\sin(1\pm n)y e^{-(1\pm n)^2\left(\frac{\sigma-\sigma_a}{G}\right)}\cdot W_{2a}\left(\frac{n\pm 1}{2}\right)\sigma_a{}^l$$
$$\cdot e^{\mp\frac{2n\sigma a}{G}}\cdot\left[+\int\frac{d\sigma}{\sigma^l} - \left(\int\frac{d\sigma}{\sigma^l}\right)_{\sigma_a} \pm \left(\frac{2n}{G}\right)\frac{1}{(2-l)}(\sigma^{2-l}-\sigma_a{}^{2-l})\right.$$
$$\left.+ \left(\frac{2n^2}{G^2}\right)\frac{1}{(3-l)}(\sigma^{3-l}-\sigma_a{}^{3-l})\right] \quad (15)$$

The mixer power at any distance from the source can be written $$W_2 = W_{2a}e^{-n^2\left(\frac{\sigma-\sigma_a}{G}\right)}\cdot\sin ny \quad (16)$$

Therefore, the gain of the sum and difference components referenced, as noted above, to the mixer is $$\text{Gain} = \frac{W_{Total}}{W_2} = e^{-(1\pm n)^2\left(\frac{\sigma-\sigma_a}{G}\right)+n^2\left(\frac{\sigma-\sigma_a}{G}\right)}e^{\pm(2n\sigma_a)/G}$$
$$\cdot\left(\frac{n\pm 1}{2}\right)\sigma_a{}^l\left[\int\frac{d\sigma}{\sigma^l} - \left(\int\frac{d\sigma}{\sigma^l}\right)_{\sigma_a} \pm \left(\frac{2n}{G}\right)\frac{1}{(2-l)}\right.$$
$$\left.(\sigma^{2-l}-\sigma_a{}^{2-l}) + \left(\frac{2n^2}{G^2}\right)\frac{1}{(3-l)}(\sigma^{3-l}-\sigma_a{}^{3-l})\right] \quad (17)$$

It will be noted that equation (17) for difference $l=1$ or $1/2$ defines the gain for spherical and cylindrical sources respectively.

For the spherical case, the gain formula is $$\text{Parametric gain} \approx \frac{\sigma_a|n\pm 1|}{2}\ln(\sigma/\sigma_a)$$
$$\cdot\exp\left[-(1\pm 2n)\left(\frac{\sigma-\sigma_a}{G}\right)\right]e^{\mp\frac{2n\sigma a}{G}} \quad (18)$$

A simplification has been made in deriving equation (18) that $(2n/G)(\sigma-\sigma_2)$ is less than 1. This simplification avoids the solution of a transcendental equation and will be valid if the pump wave amplitude exceeds that of the mixer wave amplitude. It can be also seen qualitatively that the assumption is correct since the attenuation of ultrasonic energy in water is relatively low.

Making the same assumption as given above, the parametric gain for the cylindrical case (cylindrical sources) may be expressed as follows:

$$\text{Parametric gain} \sim |n\pm 1|\sqrt{\sigma_a}(\sqrt{\sigma}-\sqrt{\sigma_a})$$
$$\cdot\exp\left[-(1\pm 2n)\left(\frac{\sigma-\sigma_a}{G}\right)\right]e^{\mp\frac{2n\sigma a}{G}} \quad (19)$$

Solutions of the foregoing equations demonstrate the features of the invention that the nonlinear parametric process is more efficient in generating a sonar beam having a difference frequency component than a conventional system which directly generates a wave having the difference frequency. The equations also show the feature that the difference frequency component will override the primary beams, especially in the far field (viz at long ranges).

Thus, from equation (15) taking by way of example, the spherical case ($l=1$) and for the difference frequency component, the following equation may be derived:

$$W_{diff} = \sin(1-n)y\cdot e^{-(1-n)^2\left(\frac{\sigma-\sigma_a}{G}\right)}\cdot W_2\left(\frac{n-1}{2}\right)e^{+\left(\frac{2n\sigma a}{G}\right)}$$
$$\cdot\sigma_a\left[\ln r/r_0 - \frac{2n}{G}(\sigma-\sigma_a) + \frac{n^2}{G^2}(\sigma^2-\sigma_a{}^2)\right] \quad (20)$$

consider the case where a wave at the difference frequency was generated directly at the source of the same sound pressure level as the pump wave. The power at any distance from the source would then be $$W = \sin(1-n)y\cdot e^{\left(-\frac{\sigma-\sigma_a}{G_{diff}}\right)} \quad (21)$$

Since in equation (21) parameters were referred to the pump frequency, (e.g. $(\sigma-\sigma_a)/G$ was referred to the pump frequency), in order to stay in the same frame of reference, equation (21) must also be referred to the pump frequency. Accordingly, $$G_{diff} = \frac{G_{pump}}{1-n} \quad (22)$$

$$\sigma_{dif} = (1-n)\sigma_{pump} \quad (23)$$

Therefore $$\frac{\sigma - \sigma_a}{G_{diff}} = (1-n)^2 \left(\frac{\sigma - \sigma_a}{G_{pump}}\right) \quad (24)$$

Equation (21) may therefore be written $$W = \sin(1-n)y \cdot e^{-(1-n)^2\left(\frac{\sigma-\sigma_a}{G_{pump}}\right)} \quad (25)$$

The parametrically generated difference wave is more efficient, since the absolute magnitude of $W$ given by equation (20 is greater than the absolute magnitude of $W$ for the directly propagated wave, as given by equation (25). The following inequality demonstrates the foregoing relationship and shows that the parametrically generated difference frequency wave is more efficient, especially if the far field at long ranges from the source.

$$1 \leq W_2\left(\frac{n-1}{2}\right)\beta\epsilon k r_0$$

$$\cdot e^{+2n\alpha r_0}[\ln r/r_0 - 2n\alpha(r-r_0) + n^2\alpha^2(r^2-r_0^2)] \quad (26)$$

where, $$\frac{\sigma}{G_{diff}} = \alpha r \text{ and } \frac{\sigma_a}{G_{diff}} = \alpha r_0$$

To show that the parametrically difference frequency component exceeds and overrides the pump component sound pressure level at long ranges, we may differentiate the equation for parametric gain, the spherical case being taken for example (equation 18). Accordingly, the point at which the difference frequency power gain reaches this maximum amplitude is given by the following equation:

$$(\sigma/\sigma)\ln(\sigma/\sigma_a) = G/\sigma_a(1-2n) \quad (27)$$

The equation can only be solved for $\sigma$ for gain maximum points if $n$ is less than one-half. This follows from the fact that the logarithmic term, $\ln(\sigma/\sigma_a)$ would then be equal to a negative number. Accordingly, $\sigma$ would be obtained which overrides the mixer where $n$ is less than 1 but greater than one-half. It can be seen that the foregoing relationship, if it exists, specifies a condition where the difference frequency component overrides the pump wave as well. Since $$W_{pump} = e^{-\left(\frac{\sigma-\sigma_0}{G}\right)} \quad (28)$$

Equation 15 can be solved for the gain of the difference component with respect to the pump component. The solution is $$\text{Gain} = \frac{W_{diff}}{W_{pump}} = \exp -\left[(1-n)^2\left(\frac{\sigma-\sigma_a}{G}\right) - \left(\frac{\sigma-\sigma_a}{G}\right)\right]$$

$$\cdot e^{+\frac{2n\sigma a}{G}} \cdot \left[\left(\frac{n-1}{2}\right)\sigma_a \ln \sigma/\sigma_a\right] \quad (29)$$

if $$\frac{2n}{G}(\sigma-\sigma_a) < 1 \quad (30)$$

$$\frac{dG}{d\sigma} = 0 = \left(\frac{2n-n^2}{G}\right)\ln\frac{\sigma}{\sigma_a} + \frac{1}{\sigma} \quad (31)$$

$$\frac{\sigma}{\sigma_a}\ln\frac{\sigma}{\sigma_a} = \frac{G}{(n^2-2n)\sigma_a} \quad (32)$$

0The right hand side of the equation 32 is always negative for $n$ greater than one-half and less than 1. Accordingly, the difference frequency $(f_1-f_2)$ will always override the pump frequency $f_1$. Since it is always small as compared thereto this can be viewed somewhat differently by considering the limit as $n$ approaches 0 (viz as the difference frequency approaches the pump frequency). As the limit is approached both gain functions also approach each other and tend to become equal. Accordingly, for all cases where $n$ is less than 1 but greater than one-half, the difference frequency component will override the mixer. This condition is graphically depicted in FIG. 3 wherein equation 15 is solved assuming a 20 db. difference in sound pressure between a pump wave at 60 kHz. and 130 db. sound pressure and a mixer wave of 48 kHz. in an initial sound pressure 110 db. At a range of 2100 meters, the difference frequency component at 12 kHz. overrides both and has an amplitude of about 19 db. Echo ranging at various distances from the source ma may readily be optimized by slightly different frequencies and power levels for the pump and mixer waves so as to optimize the power level of the difference frequency wave at the range of interest.

The sonar system provides frequency beams which are also highly directive and have very low power effects. Inasmuch as the difference frequency wave is at relatively low power in the vicinity of the sources, the side lobes are of a second order nature and are substantially eliminated. The difference field components $q$ which can be determined from the nonlinear equation of state is, $$\nabla^2\left[1-ik\left(\frac{2\eta+\eta'}{\rho_0 c_0}\right)\right]q_- + k^2 q_- = \tfrac{1}{2}(\Lambda+2)\rho_0 c_0^{-2}[k^2 k_1 \psi_1 \psi_2^*]$$

$$-[ikc_0^{-3}(2\eta+\eta')]\cdot[C\psi_1\psi_2^* - D\nabla\psi_1\cdot\nabla\psi_2^*] \quad (33)$$

wherein $\psi_1$ and $\psi_2$ are the primary pump and signal beams respectively and
$C = (k_1^4 + k_2^4 + 6 k_1^2 k_2 + k_1^3 k_2 + k_2^3 k_1)$
and
$C = (4 K_1^2 + 2 k_1 k_2 + 4 k_2^2)$.

This equation demonstrates the high degree of directivity of the difference frequency component sonar beam which is illustrated graphically in FIG. 4.

Returning now to FIG. 1, the pump and mixer transducers 10 and 12 are shown in a sonar system. The return echo at the difference frequency $f_1 - f_2$ is detected by a hydrophone 16 which is disposed along the axis 14. As noted above the maximum directivity is obtained by virtue of the fact that the mixer and pump transducers are along the same axis. In order to sweep a field, the axis may be rotated inasmuch as the mixer transducer is a lower power device, it is more desirable to rotate the mixer transducer than the pump transducer. However, the pump transducer may be rotated as will be discussed more fully in connection with FIG. 2 when the system is to be operated as an active sonar receiver. The rotation may be accomplished by means of a suitable rotation mechanism 18 such as a motor. A resolver 20 connected to the shaft of the motor provides outputs indicating the rotational position or bearing of the beam as well as the echo which is received. The echo signal is applied to a sonar system 22. This sonar system includes the usual displays and signal analysis apparatus for calculating the range and the bearing of the source from which the echo emanates.

In order to project a beam along the propagation path in the direction of the axis 14, a signal generator 24 is provided which generates electrical signals at the requisite frequencies $f_1$ and $f_2$. As noted above these frequencies may be swept over a band in order to provide more efficient echo ranging by virtue of the generation of higher sound pressure difference frequency beams at the ranges of interest.

Switching circuits 26 shown diagrammically as single-pole double-throw switches alternately connect the signal generator to the transducers 10 and 12, and to a filter circuit 28 which derives the difference frequency components. Of course, if the difference frequency component is to be varied the filter will have a variable passband.

Figure 2:
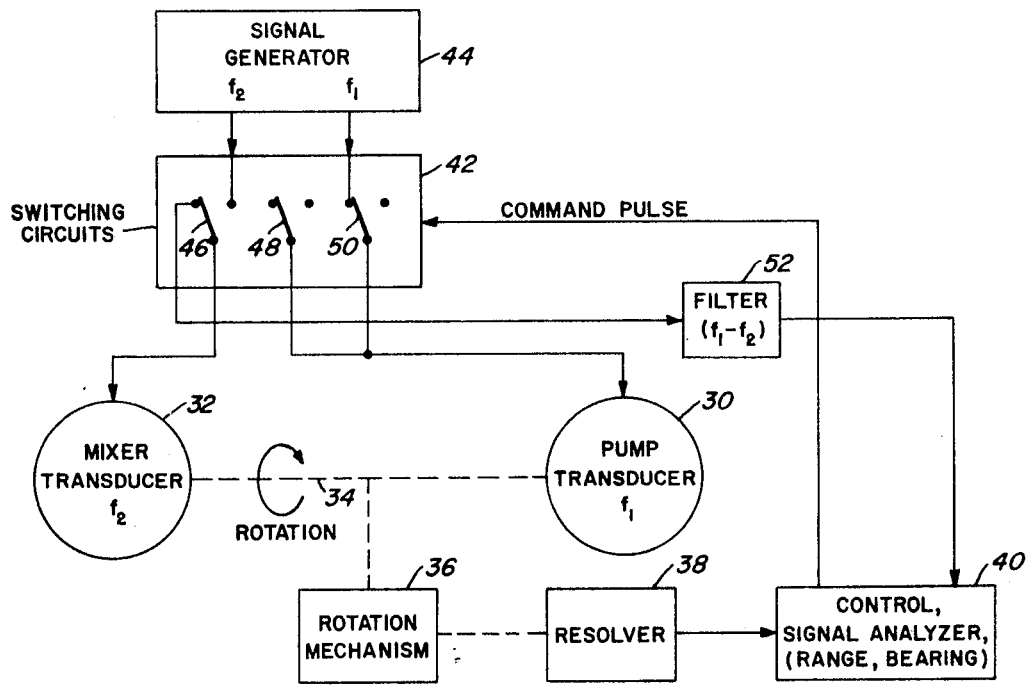
FIG. 2 is a block diagram, similar to FIG. 1 of a sonar system in accordance with another embodiment of the invention.

FIG. 2 illustrates pump and mixer transducers 30 and 32 similar to the transducers 10 and 12 (which may be either cylindrical or spherical). In the case of FIG. 2 the mixer transducer 32 and the pump transducer 30 have their centers disposed upon the axis 34 along which they are spaced from each other by a suitable distance, say 1 meter to 3 meters. The axis is rotated by a rotation mechanism 36 similar to the mechanism 18 and bearing outputs are combined by means of a resolver 38 which apply inputs to a sonar system 40.

The sonar system may operate in either of two modes. In one mode where the system is used to propagate a beam as well as to receiver echos, switching circuits 42 are operative to alternately connect a signal generator 44 which provides the electrical signals at frequencies $f_1$ and $f_2$ via switches shown schematically as single-pole double-throw switches 46 and 48 to the transducers 30 and 32. The switch 48 then connects the mixer transducer which then operates as a hydrophone to a filter which passes only the difference frequency component to the sonar set 40 for analysis. When the system is operated in the receive only mode, the switches are in the position shown in FIG. 2 of the drawing. In such position another switch 50 is operated and the generator 44 is connected to supply the pump signal to the pump transducer 30. The mixer transducer is connected to the filter via the switch 48. As the mixer transducer rotates, it will receive signals resulting from the parametric mixing of the pump wave and a sonar wave launched from an active source. The difference frequency component or the sum frequency component resulting from this intermodulation is derived by the filter 52. It may be desirable to design the filter 52 to be responsive to the sum frequency component, since that component is of greater sound pressure level in the immediate vicinity of the pump transducer.

From the foregoing description it will be apparent that there has been provided an improved sonar system which operates by the parametric interaction of acoustic waves in water. The criteria which permit such interaction as well as the frequencies at which such action is optimized have been specified with particularlity in the specification. The system itself however has been described schematically in order to highlight the invention. Conventional elements such as sliprings and the details of the filters or the sonar sets which control the system and analyzes the echos to determine the range and bearing of the target have been omitted for the sake of clarity. It will be appreciated that variations and modifications of the herein described system as well as additions thereto within the scope of the invention will undoubtedly suggest themselves to those skilled in the art. Accordingly, the foregoing description should be taken as illustrative and not in any limiting sense.

What is claimed is:

1. A sonar system which comprises:
   a. a pair of sources of acoustic energy of different frequency, at least one of which has a sound pressure level greater than the threshold where underwater nonlinear effects are significant, and
   b. said sources being disposed along a common axis for launching energy to their respective frequencies in like along a common path along which parameteric interaction of the energy from both sources is produced thereby launching a wave resulting from said interaction having greater energy in the far field distant from said sources than the energy from said sources themselves in said far field, and
   c. receiving means for deriving an output resulting from the parametric interaction of the acoustic energy from said sources.

2. The invention as set forth in claim 1, wherein the Goldberg number G for the wave produced by said one source at the location thereof is greater than 1.

3. The invention as set forth in claim 2, wherein said Goldberg number is at least 30.

4. The invention as set forth in claim 2, wherein said Goldberg number is in the range of 100.

5. The invention as set forth in claim 1, wherein said one source of said pair of sources produces a pump wave of ultrasonic frequency $f_1$ and the other of said pair of sources generates a mixer wave of frequency $f_2$ wherein:
   0.5 $n$ 1 such that the wave resulting from the intermodulation of said pump and mixer wave and equal to the difference frequency thereof has a greater amplitude than said pump and mixer waves in the far field.

6. The invention as set forth in claim 5, wherein said pump wave has a greater sound pressure level than said mixer wave.

7. The invention as set forth in claim 6, wherein said pump wave has a sound pressure level at said pump source of at least 100 db.

8. The invention as set forth in claim 7, wherein said pump wave has a sound level pressure of between 130 db. and 150 db. and said difference frequency is greater than 10 kHz.

9. The invention as set forth in claim 5 wherein said pump source and said mixer source are cylinders with their axes parallel to and disposed along the said common axis and spaced apart so that a highly directive beam at said difference frequency is produced along said common axis.

10. The invention as set forth in claim 1 wherein said pump and mixer sources are separate ultrasonic transducers, a hydrophone disposed along said axis, and signal responsive means coupled to said hydrophone and responsive to the difference frequency wave resulting from said parametric interaction in the far field.

11. The invention as set forth in claim 10, including means for generating electrical signals at said pump wave frequency and at said mixer wave frequency, means for alternately connecting said generating means to said pump and mixer transducers nd said hydrophone to said signal responsive means.

12. The invention as set forth in claim 10, including means for rotating said mixer transducer and said hydrophone about said pump transducer so that said axis revolves about said pump transducer with the center of rotation at said pump transducer.

13. The invention as set forth in claim 1, wherein said pump and mixer sources are separate transducers spaced from each other along said common axis, means for generating electrical signals at said pump wave and mixer wave frequencies, signal responsive means responsive to said difference wave frequency signals, and means for alternately connecting said signal generator to both said transducers and said signal responsive means to said signal transducer.

14. The invention as set forth in claim 13, including means for rotating said signal transducer about said pump transducer.

15. The invention as set forth in claim 13, wherein said transducers are spherical.

16. The invention as set forth in claim 13, wherein said transducers are cylindrical with the axes thereof parallel to each other.